United States Patent
Rhyu et al.

(10) Patent No.: US 7,205,697 B2
(45) Date of Patent: Apr. 17, 2007

(54) CLAW-POLE PERMANENT MAGNET STEPPING MOTOR

(75) Inventors: Se Hyun Rhyu, Bucheon-si (KR); In Soung Jung, Seoul (KR); Jin Hur, Seongnam-si (KR); Ha Gyeong Sung, Suwon-si (KR); Jung Moo Seo, Seoul (KR); Jun Hyuk Choi, Seoul (KR); Joo Han Kim, Seoul (KR)

(73) Assignee: Korea Electronics Technology Institute (KR)

( * ) Notice: Subject to any disclaimer, the term of this patent is extended or adjusted under 35 U.S.C. 154(b) by 0 days.

(21) Appl. No.: 11/337,482

(22) Filed: Jan. 24, 2006

(65) Prior Publication Data

US 2006/0192443 A1 Aug. 31, 2006

(30) Foreign Application Priority Data

Feb. 25, 2005 (KR) .................... 10-2005-0016170

(51) Int. Cl.
*H02K 1/12* (2006.01)
(52) U.S. Cl. .................................. 310/257; 310/49 R
(58) Field of Classification Search ............ 310/49 R, 310/254, 257–259
See application file for complete search history.

(56) References Cited

U.S. PATENT DOCUMENTS

| 2,122,307 | A | * | 6/1938 | Welch ..................... 310/164 |
| RE28,075 | E | * | 7/1974 | Kavanaugh ............... 310/49 R |
| 4,823,038 | A | * | 4/1989 | Mizutani et al. ............ 310/257 |
| 5,283,487 | A | * | 2/1994 | Oki et al. ................. 310/49 R |

* cited by examiner

*Primary Examiner*—Dang Le
(74) *Attorney, Agent, or Firm*—Bacon & Thomas PLLC

(57) ABSTRACT

A claw-pole PM stepping motor includes a module that is formed in such a manner that a first driving unit and a second driving unit are symmetrically arranged with respect to a first claw-pole and a second claw-pole each oppositely disposed at a main yoke member internally disposed to substantially divide an inside of a housing, an inner portion of which is rotatably inserted and supported by a rotary shaft, and the first driving unit and the second driving unit have magnet rotors coaxially arranged to generate electromagnetic force; sub-yoke members; and coil bobbins. The claw-pole PM stepping motor is exempted from a structure where coil bobbins are concentrically arranged at a periphery of magnet rotors, and instead the coil bobbins are coaxially arranged and shifted from each other from the corresponding magnet rotors, such that a miniaturized motor with a reduced outer diameter can be embodied.

13 Claims, 6 Drawing Sheets

CLAW-POLE PERMANENT MAGNET STEPPING MOTOR

BACKGROUND OF THE INVENTION

1. Field of the Invention

The present invention relates to a stepping motor, and more particularly to a claw-pole permanent magnet stepping motor.

2. Description of the Related Art

A permanent magnet (PM) stepping motor, usually called as PM stepping motor, having super miniaturized claw-poles is widely used in various equipment, such as a driving source for a lens driving of a camera and a feeding or a tilting of an optical media apparatus because it is capable of high precision position control with a comparatively simple structure.

FIG. 1 illustrates a schematic structural diagram of a PM stepping motor having claw-poles according to the conventional art. Referring to FIG. 1, the PM stepping motor is configured such that a rotary shaft 70 is inserted into an inner portion of a housing 10 and rotatably supported by the housing 10, a rotor 40 is press fitted into the rotary shaft 70, and a pair of stators 20 and 30 are disposed along an inner circumferential surface of the housing 10 for being arcuately aligned around the rotor 40.

The stators 20 and 30 axially aligned alonside are comprised of coil bobbins 22 and 32 wound by stator coils 23 and 33 and stator yokes 21 and 31. Each stator yoke 21 and 31 is disposed at one side of the housing 10 for supporting the coil bobbins 22 and 32. Each state yoke 21 and 31 has stator claw-poles 21a and 21b having a plurality of N poles and S poles. The stator claw-poles 21a and 21b are alternately aligned adjacent to each other around the circumference of the coil bobbins 22 and 23 in a comb-like form.

Meanwhile, the rotor 40 has a cylindrical shape which is formed of permanent magnet divided into a plurality of parts in a peripheral direction so as to alternately magnetize the parts into different polarities, and is centrally positioned at the stator yokes 21 and 31 and rotatably press fitted into the rotary shaft 70. The rotary shaft 70 is rotatably supported by a pair of bearings 50 and 60 each disposed at both sides of a central axial hole of the housing 10.

In the conventional claw-pole PM stepping motor thus structured, the stator yokes 21 and 31, the coil bobbins 22 and 32 and the stator coils 23 and 33 are concentrically and radially arranged at the periphery of the rotor 40, such that a problem arises of the outer diameter of the motor tends to be enlargeably formed.

SUMMARY OF THE INVENTION

The present invention has been made in light of the disadvantage described above, and it an object of the present invention to provide a compact structure of a claw-pole permanent magnet (PM) stepping motor configured to improve a structural arrangement of component parts and to reduce the outer diameter of the motor without detriment to the motor performance characteristic.

In order to achieve the object, a claw-pole PM stepping motor is structured by comprising: a housing; a rotary shaft inserted into an inner portion of a housing and rotatably supported by the housing; a main yoke member having mutually opposite protrusive first and second claw-poles and internally disposed so as to substantially divide an inside of the housing; and first and second driving units each symmetrically arranged inside the housing to correspond to the first claw-pole and the second claw-pole with respect to the main yoke member.

Preferably, the first and second driving units comprise: sub-yoke members respectively having claw-poles each corresponding to the first and second claw-poles of the main yoke member and symmetrically disposed at the rotary shaft with respect to the main yoke member; magnet rotors each press fitted into the rotary shaft so as to be respectively located in a space between the main yoke member and the sub-yoke members; and coil bobbins each coaxially coupled to the sub-yoke members and wound with coils.

According to one aspect of the present invention, preferably, the first and second driving units further comprise yoke covers coupled to the sub-yoke members so as to encompass one lateral surface of the coil bobbins.

The first and second claw-poles of the main yoke member are arcuately aligned with a plurality of pole teeth each protrusively and oppositely formed.

According to one aspect of the present invention, each pole tooth of the first claw-pole at the main yoke member and each pole tooth of the second claw-pole may be aligned at odd angles from each other.

According to another aspect of the present invention, each pole tooth of the first claw-pole at the main yoke member and each pole tooth of the second claw-pole may be interaligned in series on a straight line.

According to the present invention, the first claw-pole of the main yoke member and the second claw-pole are shifted from each other by 180 degrees in terms of electrical angle.

Furthermore, the magnet rotors of the first driving units and the second driving unit are disposed with a plurality of magnetic poles each alternately and arcuately magnetized, where the magnetic poles are shifted from each other by 90 degrees in terms of electrical angle.

According to the present invention, preferably, the claw-pole of the sub-yoke member and the magnet rotors are substantially formed with the same height.

Furthermore, coupling protruders are disposed at either the sub-yoke members or the yoke covers, as complementary coupling means, and coupling grooves are disposed at either the sub-yoke members or the yoke covers which are not provided with the coupling protruders.

Preferably, the yoke covers are provided with a plurality of fixation grooves for being inserted by each pole tooth of the first and second claw-poles at the main yoke member.

The main yoke member is provided with a ring-shaped body to which the first and second claw-poles are connected, and the rotary shaft is rotatably supported by bearings disposed at the central axial hole of the housing.

Furthermore, in such a claw-pole PM stepping motor thus structured, dimension of an outer diameter of the motor is determined by dimensions of outer diameters of the main yoke member and the sub-yoke members regardless of outer diameters of the coil bobbins, thereby enabling to embody a miniaturized stepping motor having a smaller outer diameter.

BRIEF DESCRIPTION OF THE DRAWINGS

These and other objects, features, aspects, and advantages of the present invention will become more apparent from the following detailed description of the preferred embodiment with the accompanying drawings.

DETAILED DESCRIPTION OF THE INVENTION

Preferred embodiments of the present invention will now be described in detail in accordance with the accompanying drawings.

Figure 1:
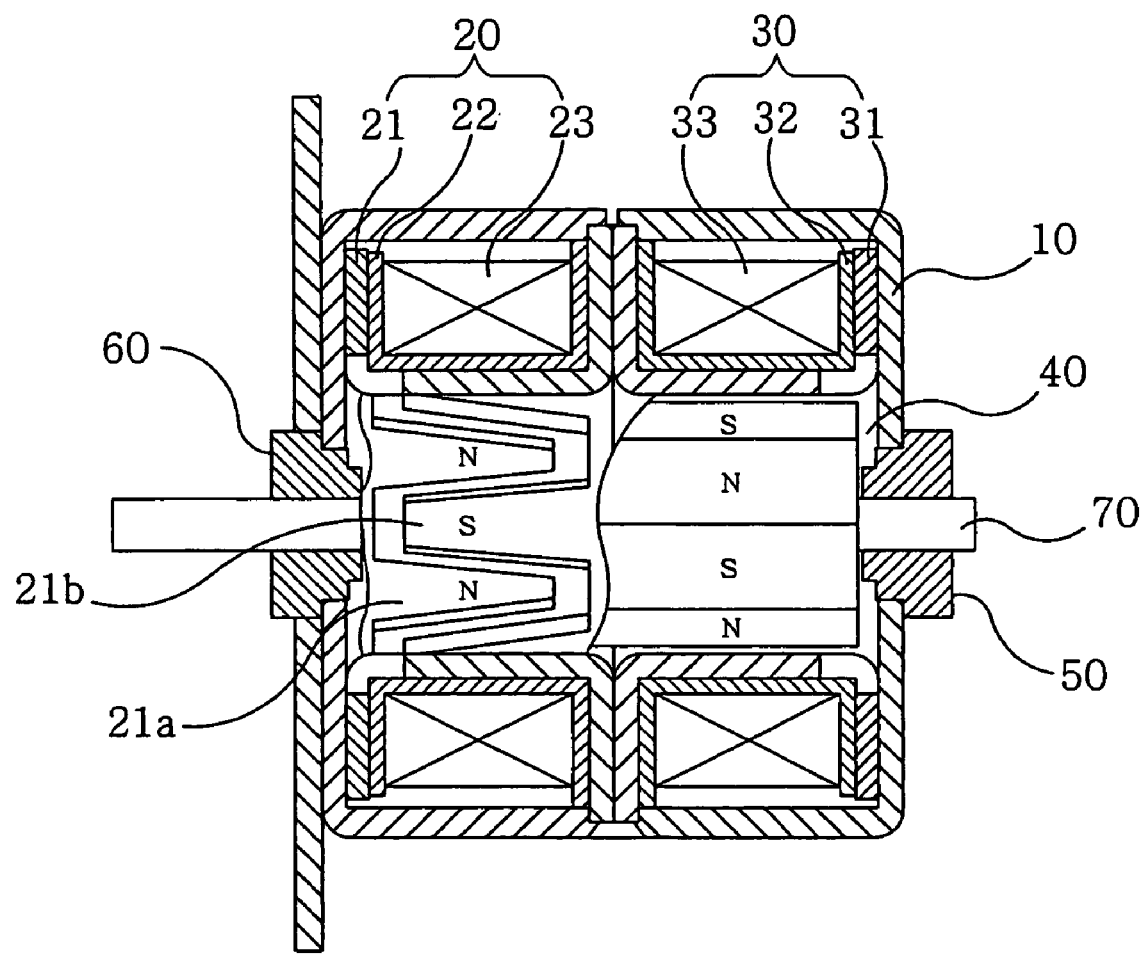
FIG. 1 is a cross-sectional view schematically illustrating a claw-pole PM stepping motor according to the prior art.
Figure 2:
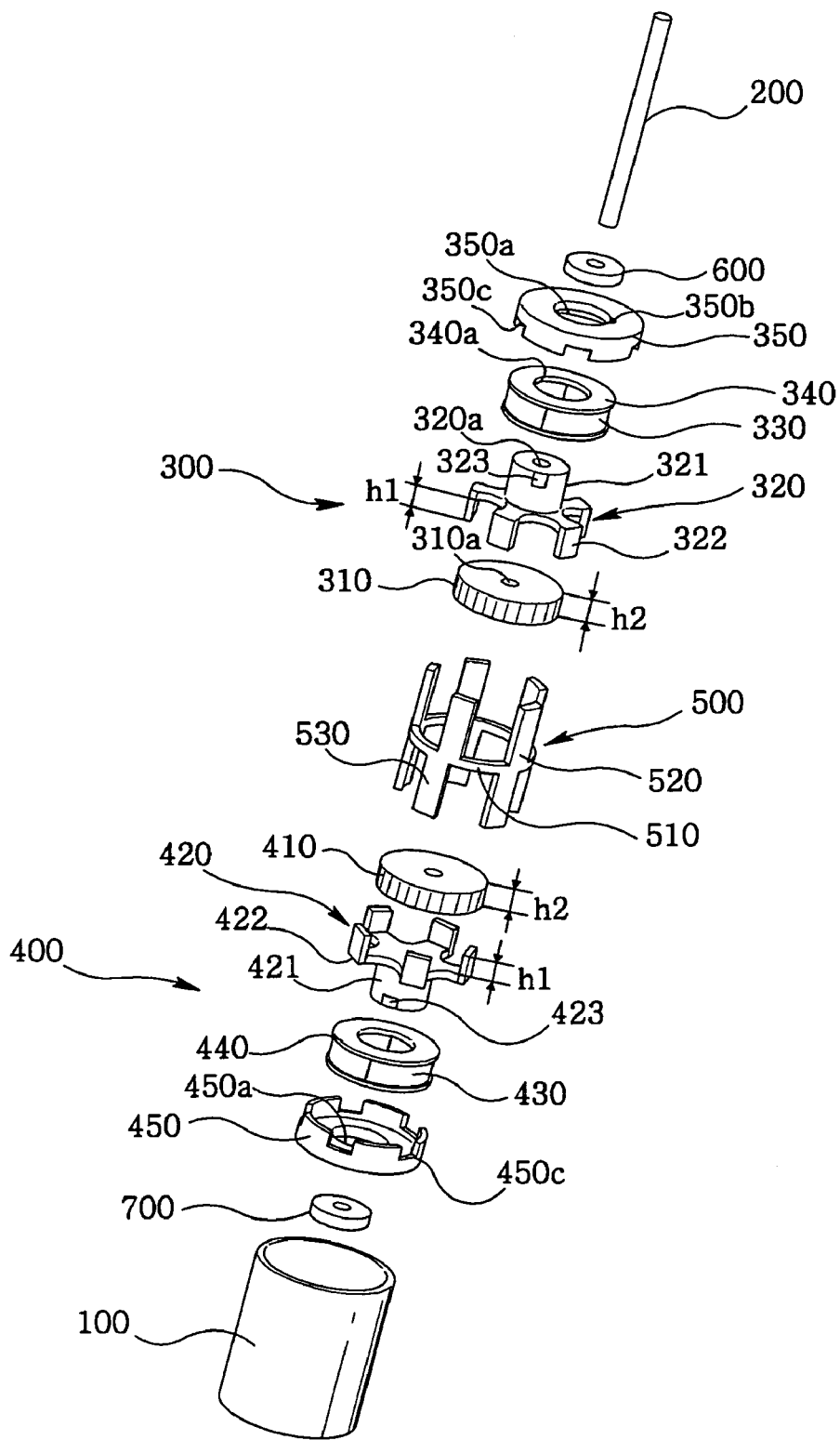
FIG. 2 is an exploded perspective view schematically illustrating a claw-pole PM stepping motor according to one embodiment of the present invention.

Referring to FIG. 2, a claw-pole PM stepping motor according to one embodiment of the present invention comprises: a housing 100; a rotary shaft 200 inserted into an inner portion of a housing 100 and rotatably supported by the housing 100; a main yoke member 500 having mutually opposite protrusive first and second claw-poles and internally disposed so as to substantially divide an inner space of the housing 100; and first and second motor assemblies driving units 300 and 400 each symmetrically arranged inside the housing 100 with respect to the main yoke member.

The main yoke member 500 is disposed with a ring-shaped body 510 supported to a circumferential surface of the housing 100, and a first claw-pole 520 and a second claw-pole 530 respectively formed by a plurality of pole teeth mutually oppositely protruded from the ring-shaped body 510.

Each pole tooth of the first claw-pole 520 at the main yoke member 500 and each pole tooth of the second claw-pole 530 are aligned at odd angles from each other, as illustrated in the figure.

According to the present invention, the first driving unit 300 and the second driving unit 400 are respectively formed in corresponding modules opposite to the first claw-pole 520 and the second claw-pole 530 of the main yoke member 500.

As illustrated in the figure, preferably, the first driving unit 300 and the second driving unit 400 include magnet rotors 310 and 410 and sub-yoke members 320 and 420 for generating mutual electromagnetic force, coil bobbins 340 and 440 wound with coils 330 and 430, and yoke covers 350 and 450 so disposed as to encompass one lateral surface of the coil bobbins 340 and 440.

The magnet rotors 310 and 410 are respectively formed at a central ring type body thereof with a central axial hole into which the rotary shaft is press fitted, and the body is peripherally and alternately formed with a plurality of N poles and S poles for magnetization.

The magnet rotors 310 and 410 are respectively positioned at a space created between the main yoke member 500 and the sub-yoke members 320 and 420, and are press fitted into the rotary shaft 200 so as to be rotated by the creation of the electromagnetic force.

According to one aspect of the present invention, the magnet rotors 310 and 410 may be manufactured in plastic magnet material, for example, by injection molding process.

Figure 3:
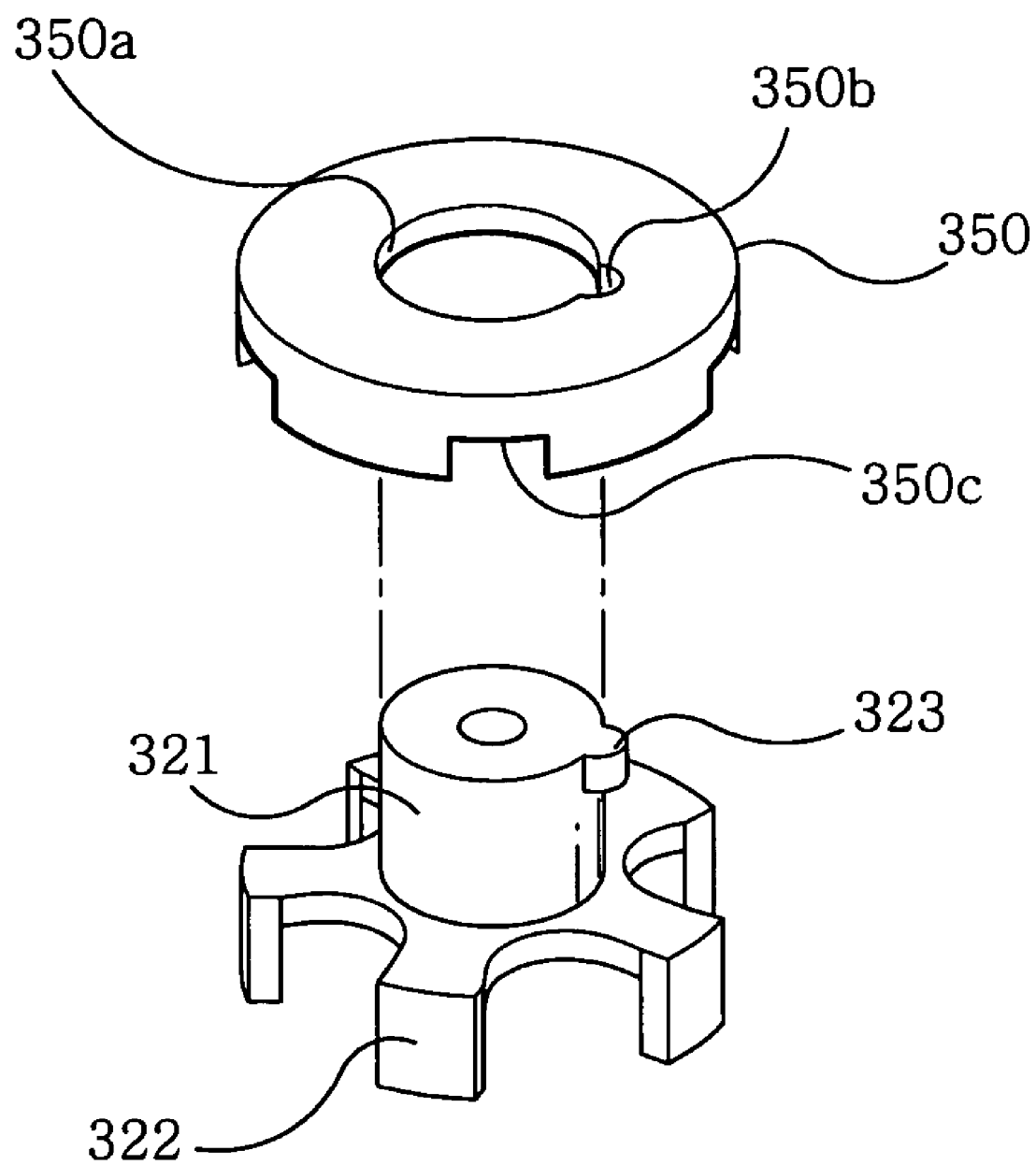
FIG. 3 is an exploded perspective view illustrating in detail principal parts of FIG. 2.

Now, referring to FIG. 3, the sub-yoke members 320 and 420 respectively include cylindrical yoke bodies 321 and 421, and weather vane-shaped pole teeth 322 and 422 which are bigger in diameter than the yoke bodies 321 and 421 and disposed at one side of the yoke bodies 321 and 421.

Furthermore, the yoke bodies 321 and 421 are centrally formed with through holes 320a and 420a into which the rotary shaft 200 is inserted. The yoke bodies 321 and 421 are respectively formed at a periphery thereof with coupling protruders 323 and 423.

Referring again to FIG. 3, the coupling protruders 323 and 423 are disposed as complementary means to coupling grooves 350b and 450b formed at an inner circumference of coupling holes 350a and 450a of the yoke covers 350 (described later).

The sub-yoke members 320 and 420 are symmetrically formed with respect to the rotary shaft 200 about the main yoke member 500 so that claw-poles 322 and 422 respectively correspond to the first claw-pole 520 and the second claw-pole 530 of the main yoke member 500.

Now, referring to FIG. 4, when the stepping motor according to the present invention is assembled, the plurality of pole teeth constituting the first claw-pole 520 of the main yoke member 500 are so coupled as to be positioned between the plurality of pole teeth constituting the claw-pole 322 of the sub-yoke member 320. Concurrently, the plurality of pole teeth constituting the second claw-pole 530 of the main yoke member 500 are so coupled as to be positioned between the plurality of pole teeth constituting the claw-pole 422 of the sub-yoke member 420. According to this coupling structure, each pole tooth of the first claw-pole 520 at the main yoke member 500 and each pole tooth of the second claw-pole 530 are aligned and shifted at odd angles from each other by 90 degrees in terms of electrical angle.

According to one aspect of the present invention, preferably, the sub-yoke members 320 and 420 are manufactured with, for example, soft magnetic body such as galvanized sheet iron or the like. Preferably, the yoke bodies 321 and 421 and the claw-poles 322 and 422 are formed to have an integral structure.

Preferably, the claw-poles 322 and 422 of the sub-yoke members 320 and 420 are formed to have substantially the same heights h1 as the heights h2 of the magnet rotors 310 and 410 in order to secure a precision in assembly. By this construction, when a stepping motor according to the present invention is finished in assembly, distal ends of the claw-poles 322 and 422 of the sub-yoke members 320 and 420 are substantially on the same horizontal planar surface with the magnet rotors 310 and 410.

The coil bobbins 340 and 440 are coaxially coupled to the yoke bodies 321 and 421 of the sub-yoke members 320 and 420 via a central coupling hole 340a, and formed with, for example, insulating material such as plastic.

The yoke covers 350 and 450 are formed with insulating material such as plastic, and respectively press fitted into both distal ends of the housing 100 in order to cover one lateral surface of each coil bobbin 340 and 440.

Referring again to FIG. 3, the yoke members 350 and 450 are centrally formed with coupling holes 350a and 450a, which in turn are respectively formed at an inner circumference thereof with coupling grooves 350b and 450b. The coupling holes 350a and 450a are respectively coupled by annular yoke members 321 and 421 of the sub-yoke members 320 and 420 and bearings (600 and 700 of FIG. 2).

The coupling grooves 350b and 450b are respectively coupled by the coupling protruders 323 and 423 as complementary means formed at a periphery of the yoke bodies 321 and 421 of the sub-yoke members 320 and 420.

The yoke covers 350 and 450 are circumferentially and equidistantly disposed with a plurality of fixation grooves 350c and 450c to form prominences and depressions. Furthermore, the fixation grooves 350c and 450c are correspondingly inserted by a plurality of pole teeth respectively constituting the first claw-pole 520 and the second claw-pole 530 of the main yoke member 500.

Figure 4A:
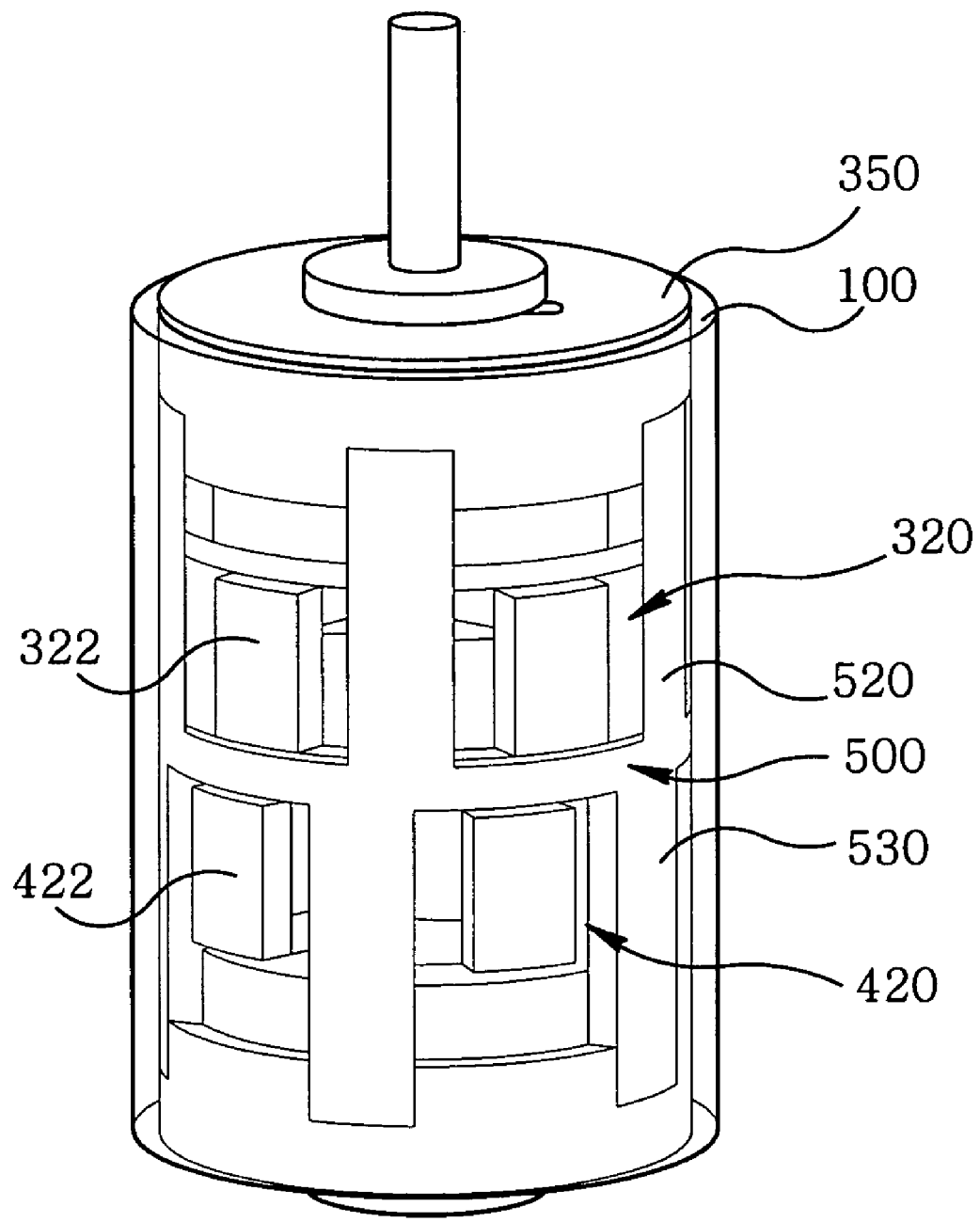
FIG. 4a is an external perspective view illustrating in perspective an assembled claw-pole PM stepping motor of FIG. 2 according to the present invention.
Figure 4B:
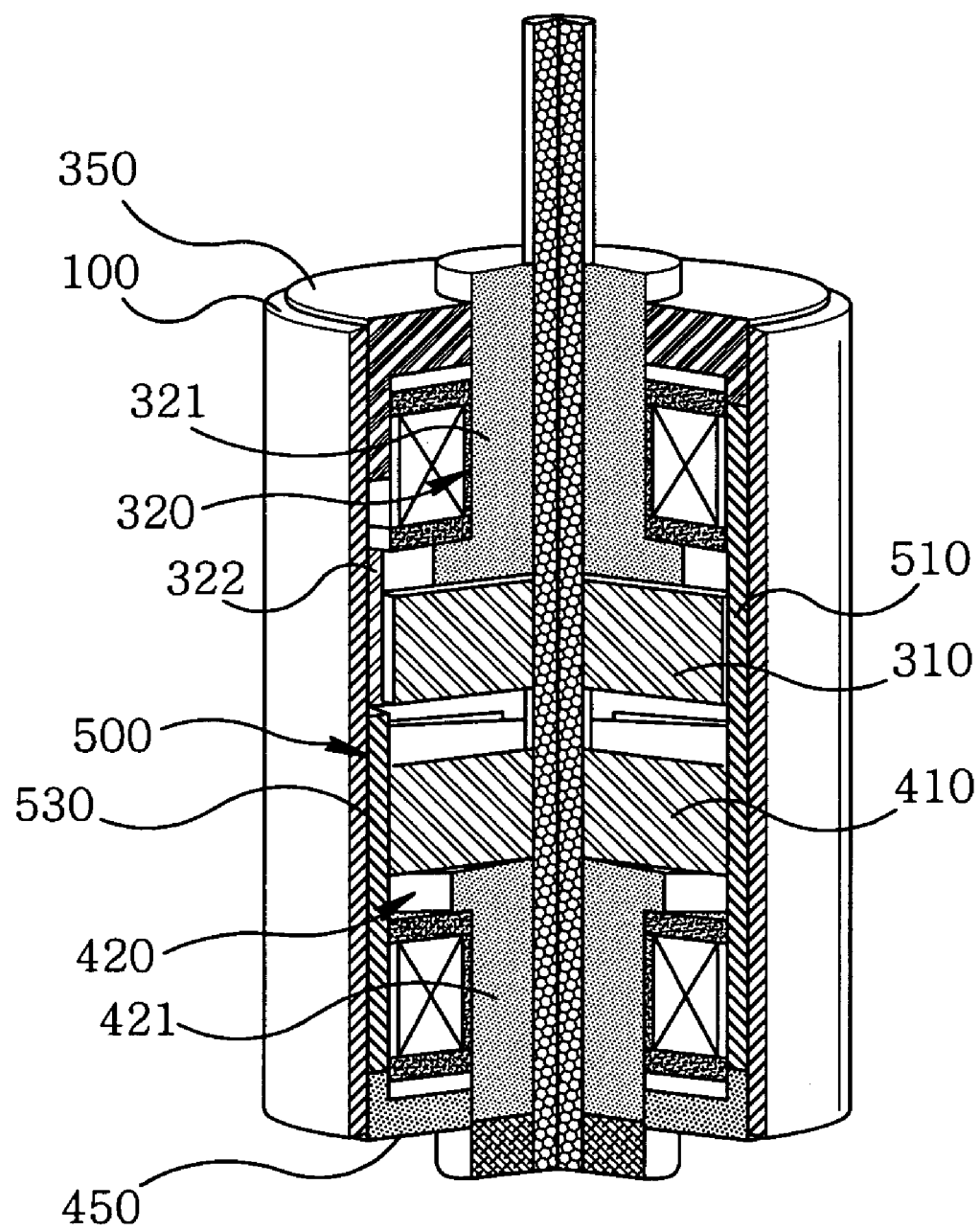
FIG. 4b is a partially sectioned away perspective view of a claw-pole PM stepping motor by partially cutting out the assembled claw-pole PM stepping motor of FIG. 2.

Now, referring to FIGS. 4a and 4b each illustrating an assembled claw-pole PM stepping motor thus constructed according to the present invention, both distal ends of the housing 100 are respectively shown closed by coupling of the yoke covers 350 and 450.

The rotary shaft 200 passes through a central axial line of the housing 100 to be rotatably supported by the bearings 600 and 700 respectively coupled to the yoke members 350 and 450.

The main yoke 500 is mounted in such a manner that it substantially divides an interior of the housing 100, where the ring-shaped body 510 is so supported as to be positioned on a central inner circumferential surface of the housing 100. Consequently, the first driving unit 300 and the second driving unit 400 form a module in which the first and second driving units 300 and 400 are symmetrically aligned about the main yoke 500.

In coupling the first driving unit 300 and the second driving unit 400, each pole tooth of the first and second claw-poles 520 and 530 at the main yoke 500 is inserted into each fixation groove 350c and 450c (see FIG. 2 or 3) of the corresponding yoke covers 350 and 450, thereby preventing the slippage.

Furthermore, the sub-yoke members 320 and 420 are press fitted into the coupling holes 350a and 450a (see FIG. 2 or 3) of the yoke covers 350 and 450 corresponding to each yoke bodies 321 and 421. At this time, each coupling protruder 323 and 423 (see FIG. 2 or 3) is complementarily inserted into each coupling groove 350b and 450b of the yoke covers 350 and 450 to thereby enable to prevent occurrence of mutual movement.

Figure 5:
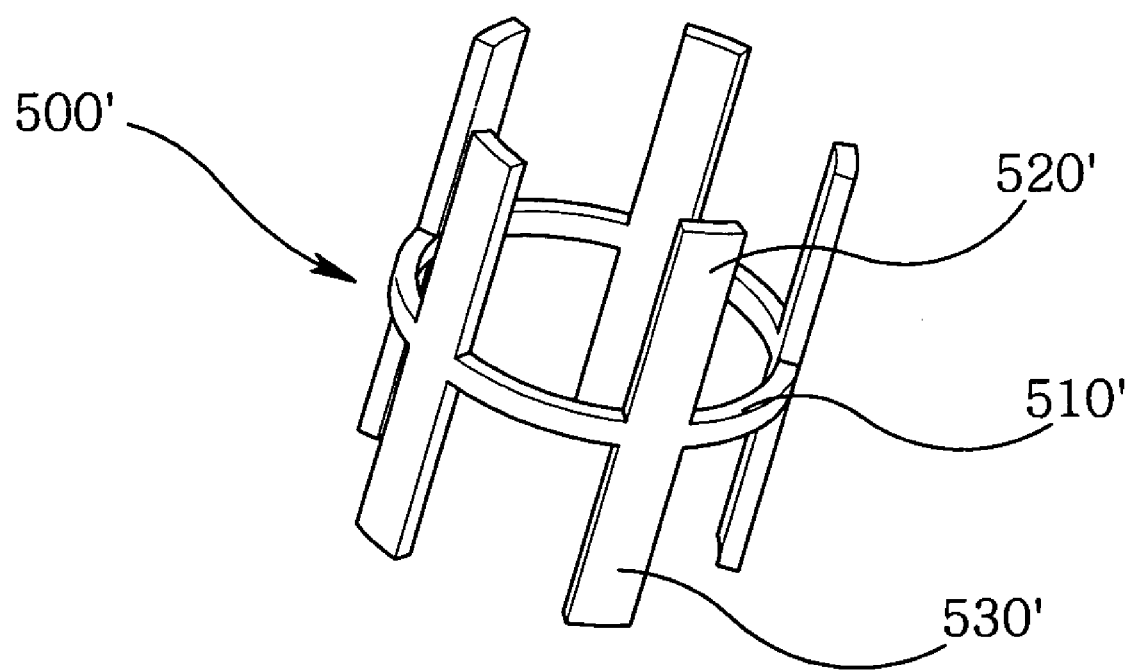
FIG. 5 is a perspective view schematically illustrating a claw-pole PM stepping motor by extracting principal parts thereof according to another embodiment of the present invention.

FIG. 5 is a perspective view schematically illustrating a claw-pole PM stepping motor according to another embodiment of the present invention by extracting a main yoke member 500' having a different structure, where each pole tooth of a first claw-pole 520' and each pole tooth of a second claw-pole 530' oppositely mounted from a ring-shaped body 510' are aligned on a straight line in series.

In the structure thus shown, a plurality of magnetic poles magnetized to each magnet rotor 310 and 410 of the first driving unit 300 and the second driving unit 400 are shifted from each other by 90 degrees in terms of electrical angle.

Now, operation of the claw-pole PM stepping motor according to the present invention thus described will be explained.

If a current is applied to the coils 330 and 430 wound around each coil bobbin 340 and 440, the first claw-pole 520 and the second claw-pole 530 of the main yoke member 500 and each pole tooth 322 and 422 of the sub-yoke members 320 and 420 are magnetized in a predetermined pattern. As a result, the magnet rotors 310 and 410 correspondingly positioned to each claw pole are rotated to a direction by electromagnetic force applied between the main yoke member 500 and the sub-yoke members 320 and 420.

In the claw-pole PM stepping motor described above according to the present invention, each coil bobbin 340 and 440 wound with coils 330 and 430 for magnetizing each claw-pole is not concentrically arranged at the periphery of the magnet rotors 310 and 410, whereas each coil bobbin 340 and 440 is aligned coaxially, shifted from each other from the corresponding magnet rotors 310 and 410 at a predetermined interval and coupled to the yoke bodies 321 and 421 which are smaller in diameter than the pole teeth 322 and 422 of the sub-yoke members 320 and 420, such that the outer diameter of the motor is not affected by the outer diameter of each coil bobbin 340 and 440, thereby enabling to manufacture a motor having a reduced outer diameter without impairing the motor performance.

Consequently, there is an advantage in the claw-pole PM stepping motor thus described according to the present invention in that components constituting each motor module are sequentially assembled, thereby enabling to improve the assembling work with ease.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. Furthermore, to the extent that the term "includes" is ever used in either the detailed description or the claims, such term is intended to be inclusive in a manner similar to the term "comprising" as "comprising" is interpreted when employed as a transitional word in a claim.

What is claimed is:

1. A claw-pole PM stepping motor comprising:
a housing;
a rotary shaft inserted in an inner portion of the housing and rotatably supported by the housing;
a main yoke member having mutually opposite protrusive first and second claw-poles and internally disposed so as to substantially divide an inner space of the housing; and
first and second driving units each comprising sub-yoke members respectively having claw-poles each corresponding to the first and second claw poles of the main yoke member, the sub-yoke members each comprising a bigger part and a smaller part in diameter and being symmetrically disposed at the rotary shaft with respect to the main yoke member; magnet rotors each press fitted into the rotary shaft so as to be respectively located in a space of the housing between the main yoke member and the bigger part of the sub-yoke members; and coil bobbins each coaxially coupled to the smaller part of the sub-yoke members and wound with coils.

2. The motor as defined in claim 1, wherein the first and second motor assemblies further comprise yoke covers coupled to the sub-yoke members so as to encompass one lateral surface of the coil bobbins.

3. The motor as defined in claim 2, wherein the sub-yoke members and the yoke cover are respectively and complementarily disposed with coupling means.

4. The motor as defined in claim 3, wherein the complementary coupling means comprises: coupling protruders disposed at either the sub-yoke members or the yoke covers; and coupling grooves correspondingly disposed at either the sub-yoke members or the yoke covers which are not provided with the coupling protruders.

5. The motor as defined in claim 2, wherein the yoke covers are provided with a plurality of fixation grooves for being inserted by each pole tooth of the first and second claw-poles at the main yoke members.

6. The motor as defined in claim 1, wherein the main yoke member has a ring-shaped body connected to the first claw-pole and the second claw-pole.

7. The motor as defined in claim 6, wherein the first and second claw-poles of the main yoke member are arcuately aligned with a plurality of pole teeth each protrusively and oppositely formed from the rig-shaped body.

8. The motor as defined in claim 6, wherein each pole tooth of the first claw-pole at the main yoke member and each pole tooth of the second claw-pole may be aligned at odd angles from each other.

9. The motor as defined in claim 6, wherein each pole tooth of the first claw-pole at the main yoke member and each pole tooth of the second claw-pole may be inter-aligned in series on a straight line.

10. The motor as defined in claim 1, wherein the first claw-pole of the main yoke member and the second claw-pole are shifted from each other by 90 degrees in terms of electrical angle.

11. The motor as defined in claim 1, wherein the magnet rotors of the first driving unit and the second driving unit are disposed with a plurality of magnetic poles each alternately and arcuately magnetized.

12. The motor as defined in claim 11, wherein the plurality of magnetic poles magnetized to each magnet rotor of the first and second driving units are shifted from each other by 90 degrees in terms of electrical angle.

13. The motor as defined in claim 1, wherein the claw-pole of the sub-yoke member and the magnet rotors are substantially formed with the same height.

* * * * *